United States Patent [19]

Falkenstein et al.

[11] 4,066,580
[45] Jan. 3, 1978

[54] PROCESS FOR THE MANUFACTURE OF POLYISOCYANURATE FOAMS

[75] Inventors: Georg Falkenstein, Neustadt; Gerhard Fahrbach, Plankstadt, both of Germany; Harald Wulff, Baton Rouge, La.

[73] Assignee: BASF Wyandotte Corporation, Wyandotte, Mich.

[21] Appl. No.: 693,502

[22] Filed: June 7, 1976

[51] Int. Cl.$^2$ ............................................. C08G 18/20
[52] U.S. Cl. ....................... 260/2.5 AW; 260/2.5 AB; 260/2.5 AC; 260/2.5 AN; 260/2.5 AM; 260/77.5 NC
[58] Field of Search ................ 260/77.5 NC, 2.5 AW, 260/2.5 AC, 77.5 AC, 75 NC, 2.5 AM, 2.5 AB, 2.5 AN

[56] References Cited

U.S. PATENT DOCUMENTS

| 3,724,288 | 4/1973 | Cobbs, Jr. et al. | 260/2.5 AP |
| 3,891,579 | 6/1975 | Cenker et al. | 260/2.5 AW |
| 3,922,238 | 11/1975 | Narayan et al. | 260/2.5 AW |
| 3,931,065 | 1/1976 | Ashida et al. | 260/2.5 AW |
| 3,969,288 | 7/1976 | Cenker et al. | 260/2.5 AW |
| 3,970,600 | 7/1976 | Falkenstein et al. | 260/77.5 AC |

*Primary Examiner*—Eugene C. Rzucidlo
*Attorney, Agent, or Firm*—Robert J. Henry; Bernhard R. Swick; Robert E. Dunn

[57] ABSTRACT

A process for the manufacture of urethane group containing polyisocyanurate foams produced by mixing polyisocyanates and polyols and (if required) frothing agents, auxiliaries and additives in the presence of a co-catalyst system which consists of a 1,3,5-tris(N,N-dialkylaminoalkyl)-s-hexahydrotriazine and an organic mono- or polycarboxylic acid, a polyesterol with an acid number greater than 4 or a mono-ester of polycarboxylic acid.

7 Claims, No Drawings

PROCESS FOR THE MANUFACTURE OF POLYISOCYANURATE FOAMS

BACKGROUND OF THE INVENTION

1. Field of the Invention

This invention relates to a process for the manufacture of urethane group containing polyisocyanurate foams, and more particularly the production of foams produced from polyisocyanates and polyols and (if required) frothing agents, auxiliaries and additives in the presence of a novel co-catalyst system.

2. Description of the Prior Art

The manufacture of polyisocyanurate foams is a familiar process. For this purpose polyisocyanates in the presence of auxiliaries and catalysts are made cyclic and are polymerized. The resulting polyisocyanate group containing isocyanurates and polymerizates are mixed with polyols. Under certain circumstances it is also appropriate to conduct the tri- and/or polymerization and polyaddition of the polyisocyanates and polyols simultaneously.

In the currently available literature numerous catalysts for the cyclization and polymerization are described. To be mentioned as examples are: concentrated bases, such as quarternary ammonium hydroxide, for instance, benzyltrimethylammonium hydroxide, alkaline metal hydroxides, for instance, sodium or potassium hydroxide, alkaline metal alkoxides, such as sodium methylate and potassium isopropylate, trialkylphosphine, for instance, triethylphosphine, alkylaminoalkylphenols, for instance, 2,4,6-tris-(dimethylaminomethyl)-phenol, 3- and/or 4-substituted pyridines, organometallic salts, for instance, tetrakis(hydroxyethyl)sodium borate, Friedel-Crafts catalysts, for instance, aluminum chloride, ferric chloride, boron trifluoride and zinc chloride and alkaline metal salts or weak organic acids and nitrophenolates, for instance, potassium octoate, potassium-2-ethyl-hexoate, potassium benzoate, sodium picrate and phthalimide potassium. Suitable trimerization catalysts are also the strongly basic N,N',N''-tris-(dialkylaminoalkyl)-s-hexahydrotriazine, for instance, the N,N'N''-tris-(dimethyl-3-aminopropyl)-s-hexahydrotriazine and 2,4,6-tris-(dialkanolamino)-s-triazine, such as 2,4,6-tris-(diethanolamino)-s-triazine and mixtures of the listed triazine derivatives.

In addition to the referred cyclization and polymerization catalysts it is often advantageous to add compounds which catalyze the polyurethane formation from polyols and polyisocyanates. Particularly well suited for this purpose are tertiary amines, such as 1,4-diazabicyclo-(2,2,2)-octane and N,N-dimethylbenzylamine, certain organometallic compounds, such as stannous octoate and dibutyltindilaurate and mixtures of tertiary amines and tin compounds.

The drawbacks of the described catalysts are that some of the compounds are difficult to obtain; that the catalysts become effective at elevated temperatures only; that the isocyanurate formation is insufficient or that the tri- and/or polymerization reaction is too slow or too fast, i.e., that the reaction cannot be controlled or be adjusted to local conditions and equipment. The literature does contain information to the effect that the catalysts can be neutralized and the isocyanurate formation can be stopped after a certain degree of polymerization is reached. If basic compounds are used this is accomplished by using inorganic acids, such as hydrochloric acid or phosphoric acid, or organic carboxylic acid chlorides such as benzoyl chloride or acetyl chloride. There is, however, no information as to how system characteristics such as the cream and rise time can be varied during the manufacture of polyisocyanurate foams.

Another drawback of the use of traditional catalysts is that relatively brittle, coarsely pored foams with medium mechanical properties may be obtained, depending upon the type of catalyst used.

SUMMARY OF THE INVENTION

The primary objects of this invention include the development of a catalyst system which permits adjusting the cream and rise times for the manufacture of urethane group containing polyisocyanurate foams to local and equipment conditions, and which also contributes to the production of difficult to ignite, urethane group containing polyisocyanurate foams with good mechanical properties.

The cream time is understood to be the time at which the frothable mixture can be poured without encountering problems, i.e., the period of time available from the time the components are mixed to the start of a visible reaction, during which the reaction components are mixed, the mixture is discharged from the mixing device and the reaction mixture is cast (or rejected). The rise time is defined as the period to reach the greatest foam volume, figured from the time the components are mixed.

It has now been found that the cream and rise times can be varied by using a particular catalyst system consisting of 1,3,5-tris(N,N-dialkylaminoalkyl)-s-hexahydrotriazine and organic carboxylic acids, monoesters of the acids or polyesterols with acid numbers greater than 4. The systems can thus be adjusted to the reactivities of the starting components and the local conditions and equipment.

The subject of this invention, therefore, is a process for the manufacture of (if required, hard to ignite) urethane group containing polyisocyanurate foams by reaction of organic polyisocyanates and polyols in the presence of catalyts and (if required) frothing agents, auxiliaries and additives; which is characterized in that a co-catalyst system is used as catalyst, consisting of 1,3,5-tris(N,N-dialkylaminoalkyl)-s-hexahydrotriazine and one organic mono- or polycarboxylic acid with 1 to 14 carbon atoms, one monoester of the polycarboxylic acid or one polyesterol with an acid number greater than 4.

DESCRIPTION OF THE PREFERRED EMBODIMENTS

With the aid of the co-catalyst system according to the invention, it is possible to manufacture urethane group containing polyisocyanurate foams with uniformly fine-celled pore structure, low brittleness, and excellent mechanical properties, in particular good compression and bending strengths. By adding the mono- or polycarboxylic acid, the catalytic effect of the 1,3,5-tris-(dialkylaminoalkyl)-s-hexahydrotriazines can be increased considerably, thereby reducing the catalytically required quantity of expensive s-triazine compounds by a considerable amount, e.g., by more than 50% in the co-catalyst system. Depending on the type and quantity of the organic carboxylic acids used as synergist, highly reactive foam systems with cream times of less than 8 seconds can be obtained for the injection mold system, or medium reactive systems with cream times of 10 to 45 seconds be achieved for the manufacture of block foams and sandwich elements. By using organic carboxylic acids and polycarboxylic acids and their monoesters, foam systems with cream times of more than 50 seconds can be obtained, and they are used for the manufacture of specialty block foams and sandwich elements. It is possible to vary the rise times in the same manner. The cream times can be extended and the rise times can be cut simultaneously or vice versa, particularly when monoesters of the polycarboxylic acids are used. The type and quantity of the applicable carboxylic acid, the polyesterol with an acid number of more than 4 or the monoester can be determined by means of simple hand mixes and the systems can be rapidly adjusted to the available equipment.

The co-catalyst system, with which the desired results are obtained, consists of 1,3,5-tris(N,N -dialkylaminoalkyl)-s-hexahydrotriazine and organic mono- or polycarboxlic acids with 1 to 14, preferably 1 to 8 carbon atoms, polyesterols with acid numbers greater than 4 or monoesters of the polycarboxylic acids.

Representative examples of 1,3,5-tris-(N,N-dialkylaminoalkyl)-s-hexahydrotriazines include 1,3,5-tris-(N,N-dimethyl-2-aminoethyl)-s-hexahydrotriazine, 1,3,5-tris-(N,N-dimethyl-3-aminopropyl)-s-hexahydrotriazine, 1,3,5-tris-(N,N-diethyl-2-aminoethyl)-s-hexahydrotriazine, 1,3,5-tris-(N,N-diethyl-3-aminopropyl)-s-hexahydrotriazine and 1,3,5-tris-(N,N-dipropyl-2-aminoethyl)-s-hexahydrotriazine. For the purpose according to this invention, however, 1,3,5-tris-(N,N-dimethyl-3-aminopropyl)-s-hexahydrotriazine is preferable.

These hexahydrotriazine components and their manufacture are well known and are described, e.g., by Nicholas et al, *Journal of Cellular Plastics* 1 (1) 85, (1965) and by Graymore, *Journal of the Chemical Society* 1493 (1931).

The exact roll played by the 1,3,5-tris-(N,N-dialkylaminoalkyl)-s-hexahydrotriazines within the scope of this invention is not known. It has been determined, however, that this type of catalyst has a rather specific effect on the frothing reaction. Generally known catalysts of other types, e.g., dimethylaminophenols, phosphine oxides, pyrrolizidine and 2,4-bis-dimethylamino-6-N methylethanolamino-s-triazine, which are used for the polyurethane and polyisocyanurate frothing reactions are not effective as part of the co-catalyst system according to this invention.

As already mentioned, polyesterols with acid numbers greater than 4, and preferably organic mono- or polycarboxylic acids with 1 to 14, particularly 1 to 8 carbon atoms or monoesters of the polycarboxylic acids are used as other components of the co-catalyst system. The mono- and polycarboxylic acids might possibly be substituted. Possible substituents include hydroxyl groups, amino groups, halogen atoms, such as fluorine and preferably chlorine and bromine, nitro-groups and alkyl, dialkyl amino and alkoxy radicals with 1 to 10, preferably 1 to 3 carbon atoms in the alkyl radical.

Well suited are cycloaliphatic, aliphaticaromatic and preferably aliphatic and aromatic mono- and polycarboxylic acids. These include in detail: aliphatic monocarboxylic acids such as formic acid, acetic acid, propionic acid, butyric acid, isobutyric acid, valeric acid, trimethylacetic acid, caproic acid, heptylic acid, caprylic acid, pelargonic acid, 2-ethylhexanoic acid, methyl-ethylcaprylic acid, lactic acid, 2-chloropropionic acid and alanine, aromatic monocarboxylic acids such as benzoic acid, o-, m-, p-toluic acid, o-, m-, p-chlorobenzoic acid, nitrobenzoic acids, dinitrobenzoic acids, hydroxybenzoic acids including salicyclic acid, anthranilic acid and α-, β-naphthalene carboxylic acid, cycloaliphatic monocarboxylic acids such as cyclohexanecarboxylic acid, aliphatic polycarboxylic acids such as citric acid, cycloaliphatic polycarboxylic acids such as cyclohexanedicarboxylic acids and cyclohexanetricarboxylic acids and preferably aliphatic dicarboxylic acids such as oxalic acid, succinic acid, maleic acid, glutaric acid, adipic acid, pimelic acid, suberic acid, azelaic acid, sebacic acid, undecane dioic acid and dodecane dioic acid, aromatic polycarboxylic acids such as benzene tricarboxylic acid, benzene tetracarboxylic acid and preferably aromatic dicarboxylic acids such as naphthalene-2,6-dicarboxylic acid, phthalic acid and terephthalic acid.

Particularly well suited and therefore used on a preferred basis are aliphatic and particularly aromatic monocarboxylic acids such as methyl-ethyl caproic acid, octenic acid, acetic acid, benzoic acid and p-dimethylaminobenzoic acid and dicarboxylic acids such as adipic acid. Polyesterols containing carboxyl groups may be used instead of the listed low molecular mono- and poly-carboxylic acids. Possible polyesterols are those with molecular weights of 500 to 5,000, preferably 800 to 3,000, hydroxyl numbers of 30 to 500, preferably 35 to 400, and acid numbers greater than 4. Particularly wellproven and therefore used preferably are polyesterols with molecular weights of 800 to 3,000, hydroxyl numbers of 35 to 400 and acid numbers of 4 to 25, especially 4 to 20. If the acid number is greater than 25 the reaction usually takes place too fast; if it is smaller than 4 the effects become too little, i.e., the crean and rise times become too great. The polyesterols may have straight or branched chain structures, and can be di- or polyfunctional. They can be produced from the regular di- and polycarboxylic acids and/or di- or polyalcohols which will be described in the following part of the description of this invention.

The monoesters suitable as a co-catalyst component may be obtained by partial esterification of the above listed poly- and preferably dicarboxylic acids. Appropriately, cyclic carboxylic anhydrides such as succinic anhydride, maleic anhydride and preferably phthalic anhydride are applied. Aliphatic mono- and dialcohols with preferably 1 to 10 and particularly 1 to 8 carbon atoms may be used as the alcoholic component. These include, e.g., methanol, ethanol, propanol, ethylene gylcol, 1,3-propane diol, isopropanol, tertiary butanol and 1,4-butane diol, 2-ethylhexanol. The monoesters are commonly produced according to familiar processes as described, for instance, in Beilstein, 3rd supplement, 4th edition, volume 9, pp. 4114. Particularly well proven and therefore used on a preferred basis are phthalic-2-ethyl-hexyl-monester, pyromellitic-2-ethyl-hexyl-diester, phthalic-methyl-monoester, phthalic-ethyl-monoester and tetrabromophthalic-2-ethyl-hexyl-monoester.

The monoesters suited as co-catalyst component can also, if desired, be produced in situ by mixing the cyclic carboxylic anhydride, preferably phthalic anhydride with the polyols suited for the manufacture of polyisocyanurate foams containing urethane groups. These polyols include, e.g., polyesterols and/or polyetherols.

For the manufacture of polyisocyanurate foams according to this invention, which may be hard to ignite, and which contain urethane groups, it may be appropriate to use mixtures of mono- and polycarboxylic acids, of polycarboxylic acids and polycarboxylic monoesters and preferably mixtures of monocarboxylic acids and polycarboxylic monoesters.

The following mono- and polycarboxylic acids are preferred for the manufacture of co-catalyst systems which cause short cream times during frothing, that is, cream times of less than 8 seconds: n-valeric acid, lactic acid and particularly octenic acid and acetic acid.

The following mono- and polycarboxylic acids have proven to be very suitable for the manufacture of co-catalyst systems with medium cream times, that is, cream times of 10 to 45 seconds: formic acid, ethylhexoic acid, naphthalene-carboxylic acid, chlorobenzoic acid and particularly methyl-ethyl-caproic acid, 2-ethyl hexoic acid and benzoic acid.

The following compounds are particulary well suited for the manufacture of co-catalyst systems with long cream times, that is, cream times of more than 50 seconds: alanine, benzoic acid, nitrobenzoic acid, 2- and 4-hydroxybenzoic acid and monoesters of polycarboxylic acid, which are used on a preferential basis.

The following monoesters of carboxylic acids are used if co-catalyst systems are required which simultaneously supply long cream times and brief rise times: phthalic-methyl-monoester, phthalic-ethyl-monoester, phthalic-isopropyl-monoester, phthalic-2-ethyl-hexyl-monoester, trimellitic-mono-2-ethyl-hexyl-monoester, tetrabromophthalic-2-ethylhexyl-monoester and particulary phthalic-2-ethyl-hexyl-monoester.

Depending upon the mono- or polycarboxylic acid used, the acid number of the polyesterol or the monoester of the polycarboxylic acid, the mole ratio between the catalyst components will vary within narrow limits. The optimum mole ratios can be easily determined and adjusted by means of simple hand mixes. Generally, the co-catalyst system according to this invention will be used with a mole ratio of the 1,3,5-tris-(N,N-dealkylaminoalkyl)-s-hexahydrotriazine to the mono- or polycarboxylic acids or monoesters of the polycarboxylic acids of approximately 30:1 to 0.7:1. Preferred is a mole ratio of the 1,3,5-tris-(N,N-dialkylaminoalkyl)-1-hexahydrotriazine to the mono- or polycarboxylic acid or monoesters of the carboxylic acids of 10:1 to 1:1 and particularly of 1:1.

If the listed mole ratios are either not reached or exceeded, the synergistic effect will appear only to a subordinate extent of the trimerization or polymerization reaction will be stopped due to too much added acid.

For the manufacture of the urethane group containing polyisocyanurate foams according to this invention, 0.5 to 15 parts by weight of the co-catalyst system are generally added per 100 parts by weight of the organic polyisocyanate. Preferably 1 to 6 parts by weight of the co-catalyst system are used per 100 parts by weight of the organic polyisocyanate.

For the manufacture of urethane group containing polyisocyanurate foams according to this invention, which can be hard to ignite, organic polyisocyanates of the formula

are well suited. In this formula R denotes aliphatic, alkylaromatic or aromatic organic radicals or mixed radicals of this type, and n denotes a whole number, the value of which corresponds with the valency of R and is at least 2. Typical organic polyisocyanates for applications according to this invention include aromatic polyisocyanates such as 2,4- and 2,6-toluene diisocyanate, 2,2'-, 2,4'-, 4,4'-diphenylmethane-diisocyanate, triphenylmethane-triisocyanate, biphenyl-diisocyanate, m- or p-phenylene-diisocyanate and 1,5-naphthalene-diisocyanate and aliphatic polyisocyanate such as isophorone-diisocyanate and hexamethylene-diisocyanate. Preferred are the crude and pure toluene diisocyanates and mixtures of 2,2'-, 2,4'- and 4,4'-diphenylmethane-diisocyanate and polyphenyl-polymethylene-polyisocyanates. The polyisocyanates may be used individually or as mixtures.

Polyisocyanurate foams can also be produced without adding polyols. However, when using the co-catalyst system according to this invention, largely brittle foams were obtained which were generally unusable for technical applications.

Polyols, which may be used for the manufacture of urethane group containing polyisocyanurate foams according to this invention, include monomeric polyols such as ethylene glycol, propylene glycol, 1,4-butane diol, trimethylolpropane, pentaerythrite, sugar alcohols, saccharose and also polyols with higher molecular weight, which are preferred, and which include polyetherols and/or polyesterols.

Suitable polyetherols may be manufactured by mixing one or more alkylene oxides with 2 to 4 carbon atoms in the alkylene radical with one starter molecule which contains several bonded active hydrogen atoms. Suitable alkylene oxides include ethylene oxide, 1,2-propylene oxide, epichlorohydrin, 1,2- and 2,3-butylene oxide. The alkylene oxides may be used individually, in alternating sequences or as mixtures. Starter molecules include water; phosphoric acid; amines such as ammonium, hydrazine, ethylene diamine, hexamethylene diamine, toluene diamine, diamino-diphenylmethane and melamine; aminoalcohols such as mono- and diethanolamine; polycarboxylic acids such as adipic acid and terephthalic acid, and polyhydroxyl compounds such as ethylene glyclol, propylene glycol, diethylene glycol, glycerin, trimethylolpropane, pentaerythrite, sorbitol and saccharose. The polyalkylene ethers, which may be straight chained, partially branched or branched, have molecular weights of 300 to 10,000, preferably 400 to 3,000, and hydroxyl numbers of 30 to 800, preferably 35 to 400.

Suitable polyester polyols may be manufactured, e.g., from dicarboxylic acids and multivalent alcohols. Suitable dicarboxylic acids include: aliphatic dicarboxylic acids such as succinic acids, glutaric acid, adipic acid, suberic acid, azelaic acid and sebacic acid, and aromatic dicarboxylic acids such as phthalic acid, isophthalic acid and terephthalic acid. The acids may be used individually or in combination. For the manufacture of polyesterols it may also be of advantage to use the corresponding carboxylic acid derivatives, such as carboxylic esters with 1 to 4 carbon atoms in the alcohol radical, carboxylic anhydrides or carboxylic chlorides. Examples for multivalent alcohols include: glycols such as ethylene glycol, diethylene glycol, butane-diol-1,4, pentane-diol-1,5, hexane-diol-1,6, decane-diol-1,10, 2,2-dimethyl-propane-diol-1,3 and 2,2,4-trimethyl-1,3-pentanediol, triols such as gylcerin and trimethylolpropane and polyols such as pentaerythrite, sorbitol and saccharose. Depending on the desired properties, the polyols may be used alone or as mixtures in various quantities.

The polyester polyols may be straight-chained or branched, may be di- or polyfunctional, and have molecular weights of 500 to 5,000, preferably of 800 to 3,000 and hydroxyl numbers of 30 to 500, preferably of 40 to 250.

Especially well suited and preferably used for the manufacture of hard to ignite, urethane group containing polyisocyanurate foams are those polyesterols which are manufactured by condensation of aliphatic dicarboxylic acids with 4 to 12 carbon atoms and a diol mixture of possibly substituted and/or ether group containing aliphatic diols with 2 to 18 carbon atoms and halogen substituted diols of the formula

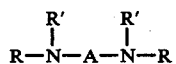

In this formula
- A stands for a halogen substituted phenylene-, naphthalene- or diphenylene radical,
- R denotes a possibly substituted aliphatic radical with 1 to 4 carbon atoms to which is bonded at least 1 hydroxyl group, and
- R' stands for one hydrogen atom or one possibly substituted aliphatic radical with 1 to 4 carbon atoms.

The German patent application No. P 24 38 369.5, owned by the Assignee of this invention, contains descriptions of such polyesterols. These polyesterols have molecular weights of 800 to 3,000, preferably 800 to 2,000 and hydroxyl numbers of 140 to 35, and more preferably 140 to 56.

The frothing agents, which may be used with the process according to this invention, require water which reacts with the isocyanate groups, forming carbon dioxide. The appropriately used water quantities amount to 0.1 to 2% relative to the weight of the polyisocyanate. Under certain circumstances greater water quantities may also be used. Preferably this should not be the case if the thermal stability or the thermal insulation properties are of importance.

Other usable frothing agents include low boiling liquids which evaporate under the influence of the exothermal polymerization reaction. Those liquids are well suited for this purpose, which are inert to the organic polyisocyanate and have boiling points of no more than 100° C. at atmospheric pressure, preferably between −40° and +50° C. Examples of such preferably used liquids are halogenated hydrocarbons such as methylene chloride, trichlorofluoromethane, dichlorodifluoromethane, dichloromonofluoromethane, dichlorotetrafluoroethane and 1,1,2-trichloro-1,2,2trifluoroethane. Mixtures of these low boiling liquids and/or mixtures with other substituted or unsubstituted hydrocarbons may be used.

The most appropriate quantity of low boiling liquids for the manufacture of semi-rigid or rigid foams is a function of the desired foam density and the possible use of water. In general 5 to 40% by weight, relative to 100 parts by weight of the organic polyisocyanate will supply satisfactory results.

Auxiliaries and additives may also be added to the reaction mixture. These include stabilizers, hydrolysis inhibitors, pore regulators, fungistatic and bacteriostatic substances, dyes, pigments, fillers, surfactants, plasticizers and flame retarding agents.

To be taken into consideration are surfactants which support the homogenation of the basic materials and which may also be suited to regulate the cell structure of the foams. Examples of these are mixed polymerizates of siloxane and oxalkylene and other organopolysiloxanes, oxethylated alkylphenols, oxethylated fatty alcohols, paraffin oils, castor oil esters and/or ricinoleic esters and Turkey red oil. These materials are used in quantities of 0.2 to 6 parts by weight per 100 parts by weight of polyisocyanate.

It may also be advantageous to include a plasticizer in the reaction mixture in order to reduce the tendency toward brittleness in the products. Traditional plasticizers may be used but it is particularly appropriate to use those materials which contain phosphorus and/or halogen atoms and which therefore increase the flame resistance of the polyurethane plastics further. These materials include tricresyl phosphate, tris-2-chloroethyl phosphate, tris-chloropropyl phosphate and tris-2,3-dibromopropyl phosphate.

In addition to the already mentioned halogen substituted phosphates, inorganic flame retardants such as antimony trioxide, arsenic oxide, ammonium phosphate and calcium phosphate may be used in order to render the urethane group containing polyisocyanurate foams resistant to flames. It has generally proven to work well to use 5 to 50 parts by weight, preferably 5 to 25 parts by weight of the flame retardant per 100 parts by weight of the organic polyisocyanate.

The polyisocyanurate foams containing urethane groups are manufactured according to the prepolymer and preferably to the one-shot process. For this purpose the polyisocyanates are brought to reaction with the polyols at temperatures of 10° to 50° C., preferably of 15° to 28° C. The quantity ratios of the components are preferably such that 6 to 60, preferably 10 to 40 NCO-groups of the polyisocyanate are available in the reaction mixture per hydroxyl group. If a mixing chamber with several inlet valves is used, the polyisocyanate, the polyol, the co-catalyst system and possibly the frothing agent, the auxiliaries and the additives can be fed into the mixing chamber individually where they can be mixed intensively. However, it is also possible to initially mix the co-catalyst system, the frothing agent, the auxiliaries and the additives with the primary component polyisocyanate or polyol and then to intensively mix the product mixture with the polyol or polyisocyanate in the mixing chamber, and to allow the frothable mixture to foam. It has been proven to be particularly advantageous to divide the co-catalyst system into its individual components and to combine the 1,3,5-tris-(N,N-dialkylaminoalkyl)-hexahydrotriazine possibly with the frothing agent, the auxiliaries and additives and the polyol to form a component A and to produce a component B from the polyisocyanate and the organic mono- or polycarboxylic acid or the monoester of the polycarboxylic acid by mixing these products together. Components A and B, stored separately, have a limited shelf life. They must only be mixed intensively prior to the manufacture of the isocyanate group containing polyisocyanurate foam according to this invention.

The urethane group containing polyisocyanurate foams manufactured according to this invention have densities of 15 to 400 kg/m³, preferably 30 to 80 kg/m³ and exhibits a uniformly fine celled pore structure, low brittleness, excellent mechanical properties, very good thermal stability and possibly flame resistance. The products may be used as insulating material.

The quantities listed in the examples and tables are relative to the standard formulations A and B. According to standard formulation A the frothable mixture of polyisocyanate, polyol catalyst and possibly frothing agents, auxiliaries and additives is allowed to froth in a conical 1,000 ml beaker with a diameter of 8 cm at the bottom and 12 cm at the top. Standard formulation B is frothed in a mold with approximately 10,000 ml volume and inside dimensions of 22 × 22 × 20 cm.

Standard Formulation A

While stirring, a mixture of
40 g of a mixture of diisocyanate-diphenylmethanes and polyphenyl-polymethylene-polyisocyanates and
X g of an organic mono- or polycarboxylic acid or of a monoester of a polycarboxylic acid
is added to a mixture of
8 g polyol
8 g tris-$\beta$-chloroethylphosphate
1.2 g 1,3,5-tris-(N,N-dialkylaminoalkyl)-s-hexahydrotriazine
0.5 g of a mixed polymerizate of siloxane-polyoxyalkylene (commercial product DC 193 by Dow Corning Corp.) and
10 g trichlorofluoromethane at room temperature.

The frothable reaction mixture is then allowed to rise in the above referred conical beaker and the cream and rise times are determined.

Standard Formulation B

While stirring, a mixture of
400 g of a mixture of diisocyanato-diphenylmethane and polyphenyl polymethylene-polyisocyanates and
X g of an organic mono- or polycarboxylic acid or of a monoester of a polycarboxylic acid
is added to a mixture of
80 g polyol
80 g tris-$\beta$-chloroethylphosphate
12 g 1,3,5-tris-(N,N-dialkylaminoalkyl)-s-hexahydrotriazine
5 g of a mixed polymerizate of siloxane-polyoxyalkylene (commercial product DC 193 by Dow Corning Corp.) and
80 g trichlorofluoromethane
at room temperature.

The frothable reaction mixture is then allowed to rise in the above referred mold and the cream and rise times are determined.

EXAMPLES 1 to 3

The urethane group containing isocyanurate foams were manufactured analogous to the data in standard formulation A. 1,3,5-tris-N,N-dimethylaminopropyl-hexahydro-s-triazine was used as 1,3,5-tris-(N,N-dialkylaminoalkyl)-s-hexahydrotriazine; benzoic acid was used as the organic carboxylic acid, while the polyol was varied. The type of the polyol, the quantity of the benzoic acid and the cream and rise times we obtained are listed in Table I.

Table I

| Example No. | Polyol | Benzoic Acid (g) | Cream Time (sec.) | Rise Time (sec.) |
|---|---|---|---|---|
| 1 | Adipic acid-diethylene glycol-N,N'-bis-(ethanol-2-)-di-amino-octachlorodiphenyl-polyester with a molecular weight of approximately 2,000 | 0.05 | 42 | 180 |
| Comparison Example | Analogous to Example 1 | None | 100 | 320 |
| 2 | Polyetherol based on trimethylolpropane-propylene oxide-ethylene oxide with a molecular weight of approximately 4,800 | 0.1 | 90 | 255 |
| Comparison Example | Analogous to Example 2 | None | 280 | Foam does not rise |
| 3 | Polyesterol based on adipic acid, ethylene glycol, 1,4-butane diol with a molecular weight of approximately 1,000 | 0.1 | 20 | 100 |
| Comparison Example | Analogous to Example 3 | None | 45 | 190 |

EXAMPLES 4 to 7

The urethane group containing isocyanurate foams were manufactured according to the standard formulation A, using a polyesterol with a molecular weight of 2,000 based on adipic acid-diethylene glycol-N,N'-bis(ethanol-2-)-diamino-octachloro-diphenyl. The 1,3,5-tris-(N,N-dialkylaminoalkyl)-s-hexahydrotriazine was varied. The type of 1,3,5-tris-(N,N-dialkylaminoalkyl)-s-hexahydrotriazine, the quantity of the benzoic acid and the cream and rise times we obtained are summarized in Table II.

TABLE II

| Example No. | 1,3,5-tris-(N,N-dialkylaminoalkyl)-s-hexahydrotriazine | Quantity (g) | Benzoic Acid (g) | Cream Time (sec.) | Rise Time (sec.) |
|---|---|---|---|---|---|
| 4 | 1,3,5-tris-(N,N-dimethylaminopropyl)-s-hexahydrotriazine | 1.2 | 0.1 | 40 | 155 |
| Comparison Example | Analogous to Example 4 | 1.2 | None | 100 | |
| 5 | 1,3,5-tris-(N,N-diethylaminopropyl)-s-hexahydrotriazine | 1.2 | 0.1 | 65 | 220 |
| Comparison Example | Analogous to Example 5 | 1.2 | None | 105 | 355 |
| 6 | 1,3,5-tris-(N,N-diethylaminobutyl)- | 2.4 | 0.1 | 90 | 320 |

TABLE II-continued

| Example No. | 1,3,5-tris-(N,N-dialkylaminoalkyl)-s-hexahydrotriazine | Quantity (g) | Benzoic Acid (g) | Cream Time (sec.) | Rise Time (sec.) |
|---|---|---|---|---|---|
| Comparison | s-hexahydrotriazine Analogous to Example 2.4 | None | 100 | foam does not rise | |
| Example 7 | 1,3,5-tris-(N,N-diethylaminoethyl)-s-hexahydrotriazine | 3.6 | 0.1 | 40 | 155 |

EXAMPLES 8 to 25

The isocyanurate foams containing urethane groups were manufactured according to standard formulation A, using a polyesterol with a molecular weight of approximately 2,000, based on adipic acid-diethylene glycol-N,N'-bis-(ethanol-2-)-diaminooctachloro-diphenyl and 1,3,5-tris-(N,N-dimethylaminopropyl)-s-hexahydrotriazine. The type and quantity of the organic mono- and polycarboxylic acids and the monoesters of the polycarboxylic acids were varied. The type and quantity of the organic acid component and the cream and rise times we obtained are summarized in Table III.

TABLE III

| Example No. | Mono- and Polycarboxylic Acids and Monoesters of Polycarboxylic Acids - Type - | Quantity (g) | Cream Time (sec.) | Rise Time (sec.) |
|---|---|---|---|---|
| Comparison Example | Without addition | — | 100 | 320 |
| 8 | Formic acid | 0.15 | 12 | 40 |
| 9 | Acetic acid | 0.1 | 6 | 60 |
| 10 | Acetic acid | 0.5 | 6 | 25 |
| 11 | Acetic acid | 1.0 | 8 | 55 |
| 12 | Valeric acid | 0.35 | 6 | 35 |
| 13 | Octenic acid | 0.55 | 5 | 25 |
| 14 | 2-ethylhexoic acid | 0.2 | 10 | 45 |
| 15 | Methyl-ethyl capronic acid | 0.1 | 15 | 75 |
| 16 | Methyl-ethyl capronic acid | 1.0 | 5 | 30 |
| 17 | Methyl-ethyl capronic acid | 2.0 | 6 | 35 |
| 18 | Benzoic acid | 0.1 | 35 | 160 |
| 19 | Benzoic acid | 0.5 | 12 | 37 |
| 20 | Benzoic acid | 2.0 | 80 | Foam does not rise |
| 21 | Naphthalene-1-carboxylic acid | 0.6 | 15 | 35 |
| 22 | Adipic acid | 0.4 | 18 | 110 |
| 23 | Maleic acid | 0.1 | 75 | 290 |
| 24 | Lactic acid | 0.3 | 7 | 80 |
| 25 | Chloropropionic acid | 0.5 | 16 | 110 |
| 26 | 4-chlorobenzoic acid 0.5 | 45 | 90 | |
| 27 | 4-hydroxy-benzoic acid | 0.5 | 70 | 235 |
| 28 | 2-hydroxy-benzoic acid | 0.5 | 50 | 155 |
| 29 | 4-dimethylaminobenzoic acid | 0.5 | 12 | 65 |
| 30 | α-alanine | 0.3 | 60 | 190 |
| 31 | Phthalic-2-ethyl-hexyl-monoester | 0.5 | 58 | 180 |
| 32 | Phthalic-2-ethyl-hexyl-monoester | 1.0 | 47 | 135 |
| 33 | Tetrabromophthalic-2-ethyl-hexyl monoester | 1.0 | 50 | 210 |
| 34 | Trimellitic-mono-2-ethyl-hexyl ester | 1.0 | 45 | 100 |
| 35 | Mixture of benzoic acid and phthalic-2-ethyl-hexyl-monoester | 0.1 0.5 | 30 | 85 |

EXAMPLES 36 to 39

The isocyanurate foams containing urethane groups were manufactured according to standard formulation B, using a polyesterol with a molecular weight of approximately 2,000, based on adipic acid-diethylene glycol-N,N-bis-(ethanol-2)-diaminooctachloro-diphenyl and 1,3,5-tris-(N,N-dimethylaminopropyl)-s-hexahydrotriazine. The type and quantity of the acid component varied. The type and quantities of the acid component and the cream and rise times we obtained are summarized in Table IV.

TABLE IV

| Example No. | Monocarboxylic Monoester or Polycarboxylic Acid - Type - | Quantity (g) | Cream Time (sec.) | Rise Time (sec.) | Bending Strength (kg/cm$^2$) | Compressive Strength (kg/cm$^2$) |
|---|---|---|---|---|---|---|
| Comparison Example | None added | — | 100 | 320 | 2.6 | 1.82 |
| 36 | Benzoic acid | 0.5 | 30 | 200 | 3.62 | 2.37 |
| 37 | Phthalic-2-ethylhexyl-monoester | 1.0 | 45 | 225 | 3.56 | 1.86 |
| 38 | Phthalic-2-ethylhexyl-monoester | 10.0 | 33 | 100 | 3.4 | 2.8 |
| 39 | Pyromellitic-di-2-ethylhexyl-monoester | 10.0 | 85 | 205 | 3.17 | 2.38 |

EXAMPLES 40 to 42

The isocyanurate foams containing urethane groups were manufactured according to standard formulation A using a polyesterol with a molecular weight of approximately 2,000, based on adipic acid-diethylene glycol-N,N-bis-(ethanol-2)-diaminooctachloro-diphenyl and various acid numbers. The acid number of the polyesterol and the cream and rise times we obtained are summarized in Table V.

TABLE V

| Example No. | Acid Number | Cream Time (sec.) | Rise Time (sec.) |
|---|---|---|---|
| 40 | 19.2 | 7 | 45 |
| 41 | 8.9 | 14 | 80 |
| 42 | 4.1 | 30 | 150 |
| Comparison Example | 0.8 | 130 | 370 |

Having thus described the invention, what it is desired to claim and secure by Letters Patent is:

1. In a process for the manufacture of polyisocyanurate foams containing urethane groups by reaction of organic polyisocyanates and polyols in the presence of a catalyst system with or without further components such as frothing agents, auxiliaries and additives, wherein the improvement consists of using catalytic amounts of a co-catalyst comprising 1,3,5-tris-(N,N-dialkylaminoalkyl)-s-hexahydrotriazine, and an organic mono- or polycarboxylic acid with 1 to 14 carbon atoms, or a monoester of the polycarboxylic acids; wherein the co-catalyst system is used at a mole ratio of 1,3,5-tris-(N,N-dialkylaminoalkyl)-s-hexahydrotriazine to organic mono- or polycarboxylic acids or monoesters of the polycarboxylic acids of 30:1 to 0.7:1.

2. A process as defined in claim 1, in which the co-catalyst system is used at a weight ratio of 0.5 to 15 parts co-catalyst system per 100 parts of organic polyisocyanate.

3. A process as defined in claim 1, in which 1,3,5-tris-(N,N-dimethyl-3-aminopropyl)-s-hexahydrotriazine is used as the 1,3,5-tris(N,N-dialkylaminoalkyl)-s-hexahydrotriazine.

4. A process as defined in claim 1, in which the monocarboxylic acids are acetic acid, methyl-ethylcapronic acid, octenic acid, 2-ethylhexoic acid, benzoic acid and p-dimethylaminobenzoic acid, and the polycarboxylic acid is adipic acid, and the monoester of the polycarboxylic acid is phthalic-2-ethyl-hexyl-monoester or trimellitic-mono-2-ethyl-hexyl-monoester.

5. A process as defined in claim 1, in which an organic polyisocyanate of the formula $$R(NCO)_n$$

is used, with R standing for a multivalent aliphatic, aromatic or alkyl-aromatic organic radical and $n$ denotes a whole number, the value of which corresponds with the valency of R and is at least 2.

6. A process as defined in claim 1, in which polyetherols with molecular weights of 300 to 10,000 and hydroxyl numbers of 30 to 800 and/or polyesterols with molecular weights of 500 to 5,000 and hydroxyl numbers of 30 to 500 or mixtures of these are used as polyols.

7. A process as defined in claim 1, in which condensation products of aliphatic dicarboxylic acids with 4 to 12 carbon atoms and a diol mixture of substituted and/or ether group containing aliphatic diols with 2 to 18 carbon atoms and halogen substituted aromatic diols of the formula $$R-\underset{\underset{R-N-A-N-R}{|}}{\overset{R'\quad R'}{|}}$$

are used as said polyols, wherein
  A stands for a halogen substituted phenylene, naphthalene, or diphenylene radical,
  R denotes a substituted aliphatic radical with 1 to 4 carbon atoms, to which at least one hydroxyl group is bonded and
  R' stands for a hydrogen atom or a substituted aliphatic radical with 1 to 4 carbon atoms.

* * * * *